June 11, 1963   R. A. ADAMSON   3,093,723
ELECTRICALLY HEATED SOLDERING IRONS
Filed March 20, 1961
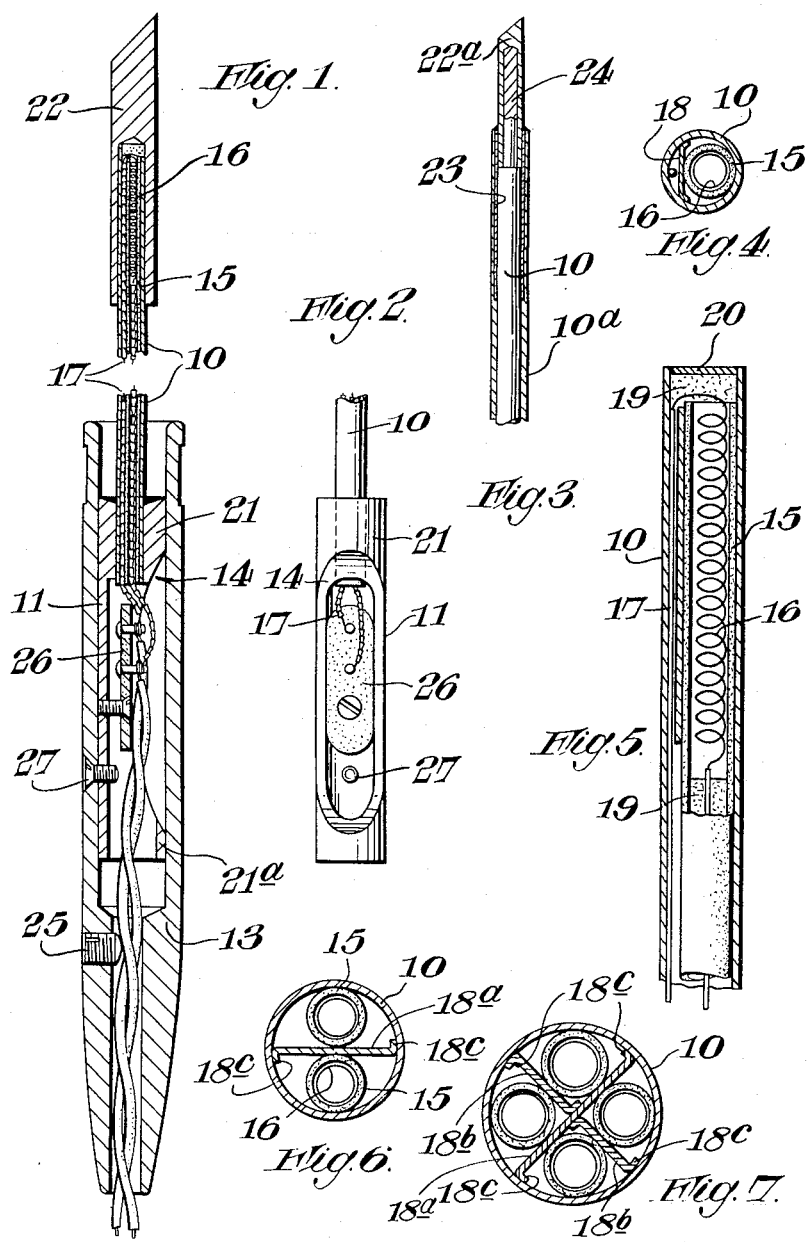
INVENTOR
ROBERT A ADAMSON
By
Atty … # 3,093,723
ELECTRICALLY HEATED SOLDERING IRONS
Robert Alfred Adamson, 35 Courtfield Rise,
West Wickham, Kent, England
Filed Mar. 20, 1961, Ser. No. 96,744
Claims priority, application Great Britain Mar. 21, 1960
8 Claims. (Cl. 219—26)

The present invention concerns electrically heated soldering irons. Under present day conditions it is necessary to ensure that adequate heat for the bit is obtained, but for many uses, the iron must be of a small size. For example, when soldering small joints in electrical and electronic apparatus, it is advisable to use an iron of small size with a body and bit of as small a diameter as possible, mainly to avoid damage to components or parts of the equipment or to wire insulation. It is the practice to use miniature irons operating from a low voltage supply voltage of 20 volts or lower. It will be appreciated that with irons as above set forth a problem arises in obtaining a sufficient bit temperature, and enough heat to make a good joint, without too much heat being developed which might result in premature failure of the elements.

It is an important object of the present invention to provide a construction resulting in an iron of minimum body and bit diameter, in relation to its wattage, in which adequate bit temperature and heat is obtained to enable all required soldering operations to be carried out, whilst ensuring a reasonable element life. Another object is to provide a construction which enables low-voltage irons to be manufactured easily and of a very small size, for example with body diameters of about ⅛ part of an inch and bit diameters of about 1/16 part of an inch. However, the invention is not limited in application to low-voltage irons but can be applied to mains-operated irons. Even so, mains-voltage irons can be constructed according to the invention which for the rated wattage and heat output, are of small size.

The present invention comprises an electrically heated soldering iron having a tubular metal body carried by a handle, a soldering tool such as a bit at the end of said body, a helical heater wire in said body and located within individual electrically insulating sleeving, the overall cross sectional area of said sleeving being less than the internal cross sectional area of the body such that a free space is provided between the sleeving and body, metal heat shunt packing within said body between the sleeving and body tube, said packing wedging the said sleeving within and directly into contact with the body tube.

A single length of sleeving may be used, or a plurality of lengths. In all cases, a helical length of wire is in the sleeving or a tube length and where the wire is within more than one tube all tubes are individual, i.e., separate, the packing holding them firmly. The sleeving conveniently is of ceramic material, although other materials such as fused silica can be used.

It is well known to provide a construction utilising a simple ceramic rod with two or more bores therethrough, through which the element coil is threaded, but with this arrangement, the centre of the rod becomes too hot, and premature element failure is likely.

It will be understood that the sleeve or sleeve assembly is located at the end of the tube which receives the bit, being as short as possible to ensure maximum heat transference to the bit.

The present invention also contemplates the use of a body comprising close fitting inner and outer tubes. In this case the inner tube is of a metal of good heat conductivity such as copper, the outer tube being of more rigid material such as iron. The inner tube need extend from the bit end only for a distance sufficient to accommodate the sleeve assembly.

The present invention further contemplates the provision of an element replacement consisting of a tube and sleeve assembly as above set forth. This can be fitted into the tubular body of an existing iron after removal of the broken unit.

In order that a clear understanding of the invention may be obtained, reference will now be made to the accompanying drawings which show, by way of example, certain preferred embodiments.

In the drawings:
FIGURE 1 is a longitudinal section of one form of soldering iron according to the invention,
FIGURE 2 is a plan view of the handle end of same,
FIGURE 3 is a longitudinal section of the bit end of a modified form,
FIGURE 4 is a transverse section through the body, showing one form of element construction,
FIGURE 5 is a longitudinal sectional view of the form shown in FIGURE 4, at the bit end of the body,
FIGURES 6 and 7 are views similar to FIGURE 4 of alternative element constructions.

As shown in the drawings, the body consists of a metal tube 10 to one end of which is secured a second tube 11 of larger diameter, this larger tube being for the purpose of receiving the connecting pieces, cable and element ends and the handle 13 and being partly cut away as at 14 to enable assembly to be performed. The body tube is preferably made of stainless steel and can simply enter the bore of the larger tube 11 by its end and be held therein by silver soldering, set screws or like means. The tube 11 can be of brass, stainless steel or mild steel. The body tube 10 houses a sleeve 15 of heat and electrical insulating material preferably a ceramic material. In the end of the sleeve remote from the handle end a helical heating element 16 is located, the forward end of the coil being brought out at the forward end of the said sleeve passing out through a locating notch in the end (not shown) where it is secured by welding or silver-soldering to a lead-out wire or wires 17 which pass along the outer surface of the ceramic sleeve 15 between it and the metal tube 10, and these wires are large enough to ensure that the ceramic tube is held for part of its circumference in close contact with the metal tube in order readily to dissipate the heat from the ceramic tube and element (see FIGURE 4). The lead-out wire 17 being in good thermal contact with the side of the ceramic tube opposite its area of contact with the outer tube and also with said outer metal tube ensures efficient heat transfer from this side, and prevents overheating or uneven heating of the element and ceramic tube. Alternatively as shown in FIGURES 4 and 5, a thinner lead out wire could be used and a metal strip 15 or even a wire or wires inserted to ensure good thermal contact between opposite sides of the ceramic tube 10 and metal tube. The rear end of the helical heating coil element is similarly secured within the tube to the second lead-out wire.

It will be seen that the outer lead-out wire is in contact with the metal tube 10, but this tube is not relied on to complete the electrical circuit. Such an arrangement applies, of course, only to irons the electrical supply to which is isolated from the mains.

The forward end of the metal tube extends a short distance beyond the end of the ceramic sleeve, and the space filled with suitable insulating cement 19 or a ceramic bead and sealed off by a metal disc cap 20. The rear end is also sealed by cement 19 as shown in FIGURE 5.

This principle can be applied in larger soldering iron elements where two or four element coils, which may be fully insulated, are employed by suitably holding the ceramic element sleeves into close contact with the outer metal tube by strips of metal sheet or foil forming a web.

Such arrangements are shown in FIGURES 6 and 7, FIGURE 6 showing two ceramic sleeves 15 each with a coil, these coils being series connected, whilst FIGURE 7 shows four sleeves 15 each with a coil. The general arrangement of each tube is as shown in FIGURE 5.

In the construction of FIGURE 6 the tubes are separated by a metal strip or web 18a whilst in the construction of FIGURE 7 three such strips 18a, 18b, 18b are used. In all arrangements, the strips as well as serving as heat shunts serve to maintain the sleeves firmly in the tube 10. The edges of the strips are bent over at 18c to provide good contact. It will be noted that the shunts carry the heat from the inner sides of the ceramic sleeves to the outer metal tube, thus preventing excessive heating in the centre of the element assembly and permitting maximum performance with less risk of element failure. Alternatively metal wire packing could be used in the tube 10.

For larger soldering irons where a replaceable element may be desirable, the elements and sleeves could be assembled in a separate metal tube or cartridge for insertion in an outer bit supporting tube. Terminal wires would be insulated with fibreglass sleeving or ceramic beads.

Other suitable insulating materials such as woven fibreglass or silicate sleeving or quartz tubing may be used as an alternative to ceramic material.

It will be understood that the metal tube at its end opposite the element is carried in the handle 13, conveniently a tubular handle.

If desired, that part of the ceramic sleeve or sleeve assembly to the rear of the part housing the element may be a separate tube or tubes, or may consist of insulating and heat-resistant beads or fibreglass sleeving.

The rear end of the ceramic sleeve and outer tube assembly are sealed off with insulating varnish or the like.

The inner lead-out wire may also be multi-strand, or a single wire at least three times the cross-sectional area of the element wire.

Various forms of bits can be used with the construction above set forth. For example, the bit 22 shown in FIGURE 1 may have a split skirt to fit on to the forward end of the outer metal tube 10 (or an outer tube), the heater element being within the skirt, as seen in FIGURE 1. The skirt may be fully split or partly split, and held with a circlip if necessary.

Alternatively, the bit may be hollow and the forward end of the element tube brazed therein so that the heating element is within the bit. The bit can be of iron or nickel, and it may have a lining of copper to improve heat conduction and thermal capacity as set forth in British Patent No. 771,247.

In many cases, it is desirable that the bit be of as small a diameter as possible in which case it can be of a diameter less than the diameter of the body. As shown in FIGURE 3, the body 10 consists of a copper tube, which is located within an outer iron tube 10a, the outer tube being counter-bored in from its front end to receive a tube 23 of copper or silver, preferably silver. The front end of the tube 10 has a projecting rod 24 of copper which is received in a bore in the bit and forms a core for the bit 22a. It will be noted particularly that there is maximum heat transference to the bit 22a which is provided with a core of good conductivity, and also is within a part of the tube 23, the heater element or the greater part thereof also being within the part of the tube 10 which is within the tube 23, as will be understood by reference to FIGURE 1.

According to a further feature of the invention, the metal tube 10 (or its outer tube) is mounted in an assembly arranged to ensure minimum heat transference to the handle and the spreading of heat reaching the handle zone. As seen in FIGURES 1 and 2 the rear end of the tube 10 is secured within the metal tube 11 having the cut-away part 14 in its length to provide a front boss 21 in which the body tube 10 is anchored, and a rear boss or sleeve 21a which locates in the handle. A cord grip screw 25 is provided in the handle.

The cut-away 14 enables a terminal board 26 to be secured in the mounting tube 11 for cord connection to the lead-out wires. A "frame" connecting tag would be provided for the "earth" wire for mains type elements.

The assembly is secured by a screw 27 passing through the handle tube into the trough-like part.

In a modified arrangement not illustrated, but which will be clear by reference to the drawings, in particular FIGURES 1 and 3, inserts of good heat-conductivity in the tube 10 extend out from the front end and are secured to the bit. This arrangement is primarily applicable to the construction shown in FIGURE 3 with the bit comprising a shell of stainless steel, nickel or like metal, with a plug of copper or silver similar to the rod 24. The body has two silver strips inserted to wedge the tube (or tubes) 15, and the bit is cut away at opposite locations down to the plug to provide opposite "flats," the projecting parts of the strips being silver-soldered or brazed one to each flat. More than two strips and flats can be used.

This arrangement assists materially in the transference of heat to the bit.

I claim:

1. An electrically heated soldering iron comprising a tubular metal body carried by a handle, a soldering tool at the end of said body, a helical heater element wire in said body and located within individual electrically insulating sleeving, the overall cross sectional area of the sleeving being less than the internal cross sectional area of the body tube so that a free space is provided between the sleeving and body, metal heat shunt packing within said body between the sleeving and body tube, said packing wedging the said sleeving within and directly into the contact with the body tube.

2. An electrically heated soldering iron comprising a tubular metal body carried by a handle, a soldering tool at the end of said body, a sleeve of electrically insulating material in said body, a single helical heater element wire in said sleeve, said sleeve having an overall cross sectional area less than the internal cross sectional area of the body tube such that a free space is provided between the sleeve and body tube, and metal heat shunt packing within said body between the sleeve and body tube to wedge the sleeve within and directly into contact with the body tube.

3. An electrically heated soldering iron comprising a tubular metal body carried by a handle, a soldering tool at the end of said body, a plurality of individual sleeves of electrically insulating material in said body, a helical heater element wire in said sleeves and metal heat shunt packing within said body to wedge the sleeves within and each in direct contact with the body tube.

4. An electrically heated soldering iron as claimed in claim 3, comprising two insulating sleeves of substantially equal diameter and a strip of packing positioned between the sleeves, the edges of said strip contacting the body tube.

5. An electrically heated soldering iron as claimed in claim 3, comprising four insulating sleeves of substantially equal diameter and strips forming the packing positioned between the sleeves, the edges of said strips contacting the body tube.

6. An electrically heated soldering iron as claimed in claim 2, comprising a body of metal of good heat conductivity, within an outer tube of a more rigid metal.

7. An electrically heated soldering iron as claimed in claim 3, comprising a body of metal of good heat conductivity, within an outer tube of more rigid metal.

8. A heater and body assembly for an electrically heated soldering iron, comprising a metal body tube, a helical heater wire element in said body, and located within individual electrically insulating sleeving, the cross sectional area of the sleeving being less than the internal cross sectional area of the body tube so that a free space is provided between the sleeving and body, metal heat shunt packing within said body tube between the insulating sleeving and body tube said packing wedging the sleeving within the body tube, heat insulating packing and a closure at one end of the body tube and heat insulating packing at the other end, lead wires to the element extending out through said packing at the said other end.

References Cited in the file of this patent
UNITED STATES PATENTS
2,073,259    Young _____ Mar. 9, 1937